United States Patent
Yoshida et al.

(10) Patent No.: US 7,830,345 B2
(45) Date of Patent: Nov. 9, 2010

(54) LIQUID CRYSTAL DISPLAY DEVICE

(75) Inventors: Hidefumi Yoshida, Tokyo (JP);
Yasutoshi Tasaka, Tokyo (JP); Hideaki Tsuda, Ebina (JP); Yohei Nakanishi, Nara (JP); Tsuyoshi Kamada, Kawasaki (JP); Masakazu Shibasaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1146 days.

(21) Appl. No.: 11/352,412

(22) Filed: Feb. 13, 2006
(Under 37 CFR 1.47)

(65) Prior Publication Data
US 2007/0024556 A1    Feb. 1, 2007

(30) Foreign Application Priority Data
Feb. 15, 2005    (JP)    ............................. 2005-038099

(51) Int. Cl.
*G09G 3/36* (2006.01)
(52) U.S. Cl. ...................................................... 345/88
(58) Field of Classification Search ............ 345/88–100
See application file for complete search history.

(56) References Cited
U.S. PATENT DOCUMENTS

| | | | |
|---|---|---|---|
| 4,840,460 A | | 6/1989 | Bernot et al. |
| 5,126,865 A | | 6/1992 | Sarma |
| 5,576,863 A | * | 11/1996 | Aoki et al. ................... 349/124 |
| 6,671,025 B1 | * | 12/2003 | Ikeda et al. ................. 349/156 |
| 6,680,771 B2 | * | 1/2004 | Yu et al. ...................... 349/139 |
| 6,914,656 B2 | * | 7/2005 | Sakamoto et al. ........... 349/141 |
| 2001/0048496 A1 | * | 12/2001 | Baek ........................... 349/114 |
| 2002/0067329 A1 | * | 6/2002 | Toko et al. ..................... 345/94 |
| 2004/0169806 A1 | * | 9/2004 | Takeda et al. ............... 349/130 |
| 2004/0218126 A1 | * | 11/2004 | Kim et al. .................... 349/119 |
| 2005/0162594 A1 | * | 7/2005 | Sasabayashi ................. 349/123 |
| 2005/0219186 A1 | * | 10/2005 | Kamada et al. ............... 345/90 |
| 2006/0103800 A1 | | 5/2006 | Li et al. |

FOREIGN PATENT DOCUMENTS

| JP | 5-66412 | 3/1993 |
|---|---|---|
| JP | 2006-126842 A | 5/2006 |

* cited by examiner

*Primary Examiner*—Richard Hjerpe
*Assistant Examiner*—Carolyn R Edwards
(74) *Attorney, Agent, or Firm*—Nixon & Vanderhye P.C.

(57) ABSTRACT

One picture element is divided into first and second sub-picture element regions. A sub-picture element electrode connected directly (not via capacitive coupling) to a source electrode of a TFT is placed in the first sub-picture element region and a sub-picture element electrode capacitively coupled to a control electrode connected to a source electrode is placed in the second sub-picture element region. A transparent resin film is formed in the first sub-picture element region and this makes a liquid crystal layer thickness in the second sub-picture element region thicker than that of the first sub-picture element region.

12 Claims, 10 Drawing Sheets

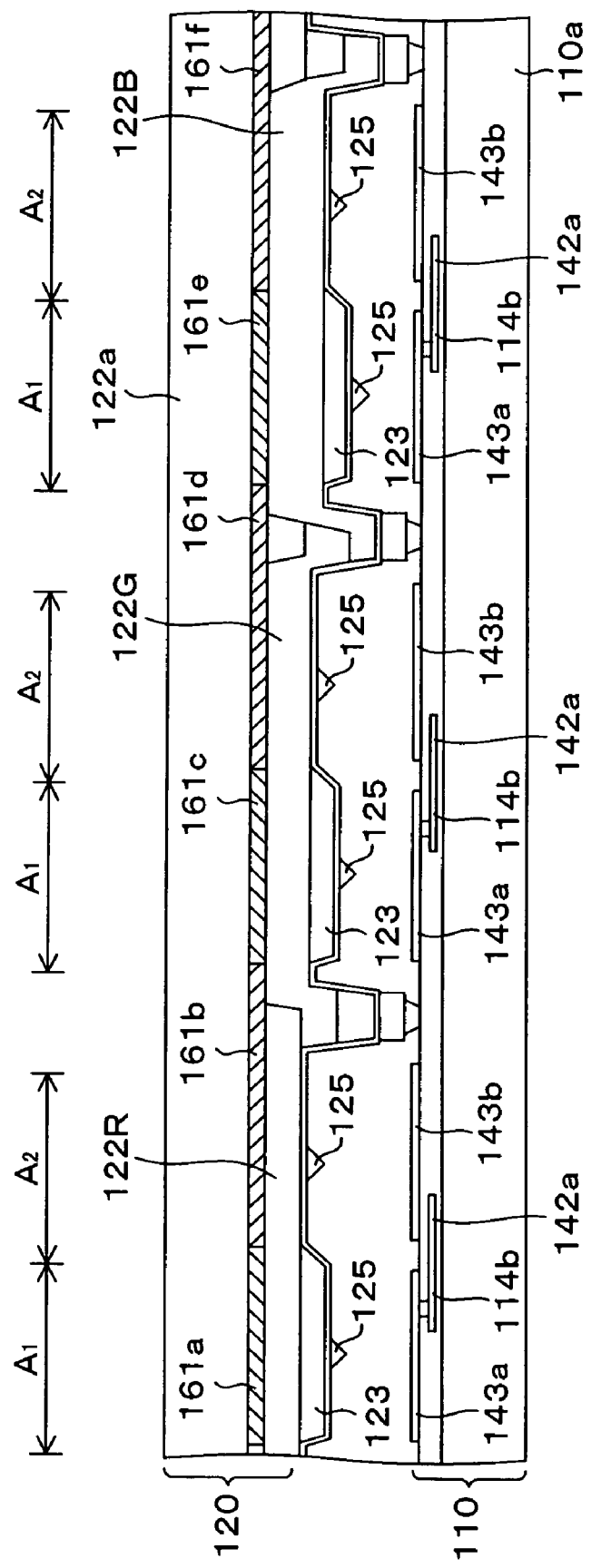

LIQUID CRYSTAL DISPLAY DEVICE

CROSS-REFERENCE TO RELATED APPLICATIONS

This application is based on and claims priority of Japanese Patent Application No. 2005-038099 filed on Feb. 15, 2005, the entire contents of which are incorporated herein by reference.

BACKGROUND OF THE INVENTION

1. Field of the Invention

The present invention relates to a liquid crystal display device provided with a plurality of sub-picture element electrodes to which mutually different voltages are applied in one picture element region.

2. Description of the Related Art

Liquid crystal display devices have advantages over Cathode Ray Tube (CRT) in that they are thin, light, and capable of being driven by a low voltage with small power consumption. Accordingly, liquid crystal display devices are used for various electronic instruments such as televisions, notebook personal computers (PC), desktop computers, personal digital assistants (PDA), and mobile phones. In particular, a liquid crystal display device of an active matrix type provided with a thin film transistor (TFT) as a switching element per each picture element (sub-pixel) exhibits display characteristics as good as those of the CRT due to its high driven capabilities and is widely used, for desktop PCs and televisions for example, in the area where the CRT has been used.

Generally, a liquid crystal display device is configured of two transparent substrates and a liquid crystal filled in a space between these substrates. Picture element electrodes, TFTs, and the like are formed for each picture element on one substrate whereas color filters opposite to picture element electrodes and a common electrode common to each picture element are formed on the other substrate. Hereinafter, a substrate on which the picture electrodes and TFTs are formed is referred to as a TFT substrate and a substrate placed opposite to the TFT substrate is referred to as an opposite substrate. Moreover, a structure configured by filling a liquid crystal in a space between the TFT substrate and the opposite substrate is called a liquid crystal panel.

Twisted nematic (TN) liquid crystal display devices formed by filling the horizontally aligned liquid crystals (the liquid crystals with positive dielectric anisotropy) in a space between two substrates and twisting and aligning liquid crystal molecules have hitherto been widely used. However, the TN liquid crystal display devices are associated with drawbacks such as the poor viewing angle characteristics and large changes in contrasts and color tones when viewed from an oblique direction. Accordingly, multi-domain vertical alignment (MVA) liquid crystal display devices have been developed and put to practical use.

Incidentally, although the conventional MVA liquid crystal display devices exhibit favorable viewing angle characteristics compared to the TN liquid crystal display devices, a phenomenon where the screen appears whitish occurs when viewed from an oblique direction.

FIG. 1 is a diagram showing T-V (transmittance-applied voltage) characteristics when viewing a screen from the front and from the direction 60° above. In FIG. 1, the horizontal axis represents voltage applied, and the vertical axis represents transmittance. As shown in FIG. 1, when a voltage somewhat higher than the threshold voltage is applied to a picture element electrode (the area enclosed by a circle in the figure), transmittance when viewed from an oblique direction becomes higher than that when viewed from the front. In addition, when the applied voltage is enhanced to some extent, the transmittance when viewed from an oblique direction becomes lower than that when viewed from the front. Accordingly, differences in brightnesses among red, green, and blue picture elements becomes small when viewed from oblique directions and a phenomenon where the screen appears whitish occurs as described earlier. This phenomenon is called a "wash out". Wash outs occur not only in MVA liquid crystal display devices but also in TN liquid crystal display devices.

A provision of a plurality of sub-picture element electrodes in one picture element and capacitively coupling these sub-picture element electrodes are proposed in the specification of U.S. Pat. No. 4,840,460. Since the voltage applied to each sub-picture element electrode is determined according to capacitances between each of sub-picture element electrodes in such liquid crystal display devices, it is possible to apply mutually different voltages to each sub-picture element electrode. Therefore, a plurality of regions with different threshold values for T-V characteristics are apparently present in one picture element region. When there is a plurality of regions with different threshold values for T-V characteristics in one picture element region as described so far, T-V characteristics of that picture element region will be the T-V characteristics of combined T-V characteristics of each sub-picture element region. As a result, a phenomenon where the transmittance when viewed from an oblique direction becomes higher than that when viewed from the front is suppressed, and thus the phenomenon where screen appears whitish (wash out) is also suppressed.

Moreover, a liquid crystal display device formed by dividing a picture element electrode into a plurality of sub-picture element electrodes and placing a control electrode below each sub-picture element electrode with an insulating film interposed in between the control electrode and each sub-picture element electrode in order to improve viewing angle characteristics is also disclosed in Japanese Patent Laid-open Official Gazette No. Hei. 5-66412. In this liquid crystal display device, the same voltage is applied to each control electrode via the TFT and the voltage in accordance with the capacitance between the control electrode and the sub-picture element electrode is applied to each sub-picture element electrode.

A method of improving displaying characteristics by dividing one picture element region into a plurality of sub-picture element regions with different T-V characteristics as described in these official gazettes is called the halftone grayscale (HT) method.

FIG. 2 is a schematic diagram showing an example of a conventional MVA liquid crystal display device adopting the HT method. One picture element is divided into a first sub-picture element region A1 and a second sub-picture element region A2 in this liquid crystal display device.

TFT (not shown), an insulating film 11, a control electrode 12a connected to a source electrode 12 of the TFT, a first sub-picture element electrode 13a, and a second sub-picture element electrode 13b are formed on a TFT substrate 10. The first sub-picture element electrode 13a is placed on the insulating film 11 in the first sub-picture element region A1 and is electrically connected to the source electrode 12 of the TFT via a contact hole. Moreover, the second sub-picture element electrode 13b is placed on the insulating film 11 in the second sub-picture element region A2 and is capacitively coupled with the control electrode 12a with the insulating film 11 interposed in between.

On the other hand, a common electrode 21 and projections for alignment control 22 are formed on the opposite substrate 20. The common electrode 21 is opposite to both sub-picture element electrodes 13a and 13b while interposing a liquid crystal layer in between. Moreover, the protrusions 22 are formed of a dielectric such as resins and placed almost in a central position between the first and second sub-picture element regions A1 and A2.

Hereinafter, a sub-picture element electrode directly (in other words, without via capacitive coupling) connected to the TFT like the sub-picture element electrode 13a is also referred to as a directly connected picture element electrode. In addition, a sub-picture element electrode connected to the TFT via capacitive coupling like the sub-picture element electrode 13b is referred to as a capacitively coupled picture element electrode.

FIG. 3 is a diagram showing an equivalent circuit of the liquid crystal display device shown in FIG. 2. In this FIG. 3, reference numerals 15 and 16 denote a gate bus line supplied with scanning signals and a data bus line supplied with display signals, respectively. Moreover, Cs is an auxiliary capacitance connected between the source electrode 12 of a TFT 17 and earth, and $C_{LC1}$ is a capacitance between the sub-picture element electrode (directly connected picture element electrode) 13a and the common electrode 21. Furthermore, $C_1$ is a capacitance between the control electrode 12a and the sub-picture element electrode (capacitively coupled picture element electrode) 13b, and $C_{LC2}$ is a capacitance between the sub-picture element electrode 13b and the common electrode 21.

Liquid crystal molecules 30 in the first and second sub-picture element regions A1 and A2 are all aligned almost perpendicular to a substrate surface when no voltage is applied to the liquid crystal layer (initial state). It should be noted that the liquid crystal molecules in the vicinity of the protrusions 22 are aligned almost perpendicular to inclined planes of the protrusions 22.

When the scanning signals are supplied to the gate bus line 15 and the TFT 17 is turned on, the display signals are supplied from the data bus line 16 to the source electrode 12 and the liquid crystal molecules 30 are inclined at an angle according to the applied voltage. Since the liquid crystal molecules 30 are encouraged to align perpendicular to the inclined planes of the protrusions 22 at this time following the example of the liquid crystal molecules in the vicinity of the protrusions 22, directions in which liquid crystal molecules 30 are inclined are mutually different in both sides of the protrusions 22 and thus, multi-domains are achieved.

Moreover, a voltage of the display signals is applied to the sub-picture element electrode 13a whereas a voltage of the division of the display signals by $C_1$ and $C_{LC2}$ is applied to the sub-picture element electrode 13b in this liquid crystal display device. In other words, the voltage applied to the sub-picture element electrode 13b will be lower than that applied to the sub-picture element electrode 13a. Accordingly, as shown in FIG. 2, inclination angle (an angle inclined from that of the initial state) of liquid crystal molecules 30 in the second sub-picture element region A2 will be smaller than that of liquid crystal molecules 30 in the first sub-picture element region A1.

As described so far, favorable viewing angle characteristics can be obtained owing to the formation of a plurality of regions with mutually different alignment directions of liquid crystal molecules in one picture element in the MVA liquid crystal display device shown in FIG. 2.

However, inventors of the present invention and others consider that there are problems associated with the above described, conventional MVA liquid crystal display device as follows. That is, since the voltage applied to the liquid crystal layer in the second sub-picture element region A2 is lower than that applied to the liquid crystal layer in the first sub-picture element region A1, brightness in the white display mode will be lower than that of MVA liquid crystal display devices not adopting the HT method. When the applied voltage is further increased in order to enhance the brightness in the white display mode, the peak of T-V characteristics is exceeded in the first sub-picture element region A1 and the brightness is reduced, and also a phenomenon where the screen appears yellow occurs when viewed from the front.

SUMMARY OF THE INVENTION

As described so far, an object of the present invention is to provide a liquid crystal display device capable of suppressing wash outs and having a high brightness in the white display mode.

Problems described above can be solved by a liquid crystal display device characterized in the following features. The liquid crystal display device is formed of a first and second substrates placed opposite to each other and a liquid crystal filled in a space between these substrates while one picture element is divided into at least a first and second sub-picture element regions. The liquid crystal display device includes a first sub-picture element electrode formed in the first sub-picture element region on the first substrate and applied with a first voltage in accordance with display signals, a second sub-picture element electrode formed in the second sub-picture element region on the first substrate and applied with a second voltage lower than the first voltage, and a common electrode formed on the second substrate and opposite to the first and second sub-picture element electrodes while interposing a liquid crystal layer in between. In the liquid crystal display device, a liquid crystal layer thickness of the second sub-picture element region is thicker than that of the first sub-picture element region.

In the present invention, a lower voltage is applied to the second sub-picture element electrode placed in the second picture element region than that applied to the first sub-picture element electrode placed in the first sub-picture element region. In other words, two regions with different threshold values of T-V characteristics are present in one picture element. For this reason, a phenomenon where the screen appears whitish when viewed from an oblique angle (wash out) is suppressed and viewing angle characteristics are improved.

Moreover, the thickness of the liquid crystal layer in the second sub-picture element region where the second sub-picture element electrode is being placed is made thicker than that of the liquid crystal layer of the first sub-picture element region where the first sub-picture element electrode is being placed. A retardation of the liquid crystal layer is described by Δnd. Here, Δn describes a birefringence of liquid crystal and d denotes a thickness of the liquid crystal layer. In the present invention, since the liquid crystal layer is thicker in the second sub-picture element region than in the first sub-picture element region, influence by the birefringence of the liquid crystal layer is large and the initial rise in T-V characteristics will be steep as a result. For this reason, the brightness in the second sub-picture element region in the white display mode is increased. Moreover, since it is not necessary to increase the voltage of the display signals excessively in order to enhance the brightness in the second sub-picture element region A2, the phenomenon where screen appears yellow when viewed from the front is avoided.

BRIEF DESCRIPTION OF THE DRAWINGS

FIG. 12 is a schematic diagram showing a deformability of the third embodiment and an example of adopting a viewing angle compensation film to a liquid crystal display device in which cell gaps for red, green, and blue picture elements are optimized, respectively.

DESCRIPTION OF THE PREFERRED EMBODIMENTS

The present invention will be described below with reference to the attached drawings.

Figure 4:
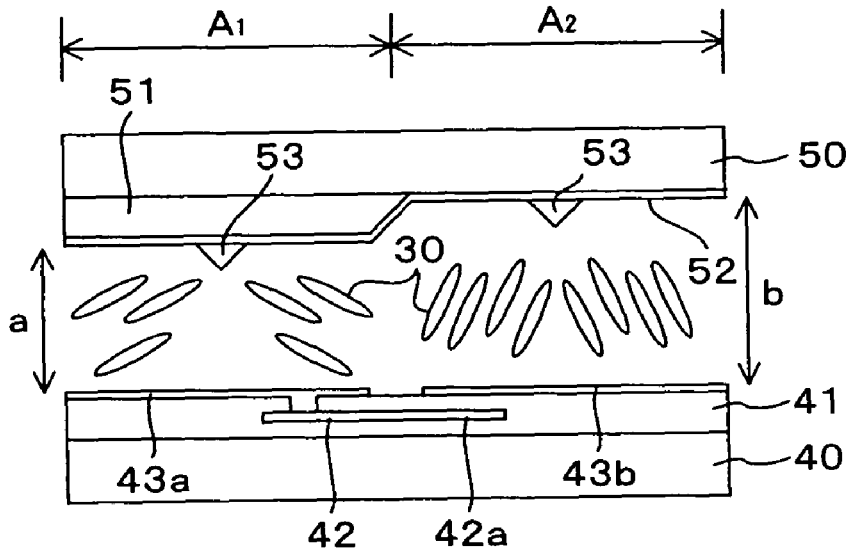
FIG. 4 is a schematic diagram showing a liquid crystal display device of an embodiment of the present invention.

FIG. 4 is a schematic diagram showing a liquid crystal display device of an embodiment of the present invention. This liquid crystal display device has a structure in which liquid crystals with a negative dielectric anisotropy are filled in a space between a TFT substrate 40 and an opposite substrate 50. Moreover, in this liquid crystal display device, one picture element region is divided into a first sub-picture element region A1 and a second sub-picture element region A2.

A TFT (not shown), an insulating film 41, a control electrode 42a connected to a source electrode 42 of the TFT, a first sub-picture element electrode (directly connected picture element electrode) 43a, and a second sub-picture element electrode (capacitively coupled picture element electrode) 43b are formed on the TFT substrate 40. The first sub-picture element electrode 43a is placed on the insulating film 41 in the first sub-picture element region A1 and is electrically connected with the source electrode 42 of the TFT via a contact hole. Moreover, the second sub-picture element electrode 43b is placed on the insulating film 41 in the second sub-picture element region A2 and is capacitively coupled to the control electrode 42a via the insulating film 41. These first and second sub-picture element electrodes 43a and 43b are both formed of a transparent conductive material such as indium-tin oxide (ITO).

On the other hand, a transparent resin film (transparent insulating film) 51, a common electrode 52, and protrusions for alignment control 53 are formed on the opposite substrate 50. The common electrode 52 is formed of a transparent conductive material like ITO and opposing both sub-picture element electrodes 43a and 43b while interposing a liquid crystal layer in between. Note here that the transparent resin film 51 is formed between a glass substrate, which is to become a base, and the common electrode 52 in the first sub-picture element region A1. A liquid crystal layer thickness a in the first sub-picture element region A1 will be smaller than a liquid crystal layer thickness b in the second sub-picture element region A2 due to this transparent resin film 51.

The protrusions for alignment control 53 is formed of a dielectric like resins and placed almost in a central position between the first and second sub-picture element regions A1 and A2. A cross section of this protrusion 53 is almost triangular.

The voltage applied to the second sub-picture element electrode 43b is lower than the voltage applied to the first sub-picture element electrode 43a by an amount of capacity coupling in the liquid crystal display device configured in such a way. Moreover, a retardation Δnd of the liquid crystal layer is larger in the second sub-picture element region A2 than that of the first sub-picture element region A1 due to the transparent resin film 51. Therefore, the second sub-picture element region A2 is more affected by birefringence of the liquid crystal layer compared to the first sub-picture element region A1 and initial rise in T-V characteristics will be steep.

Figure 5:
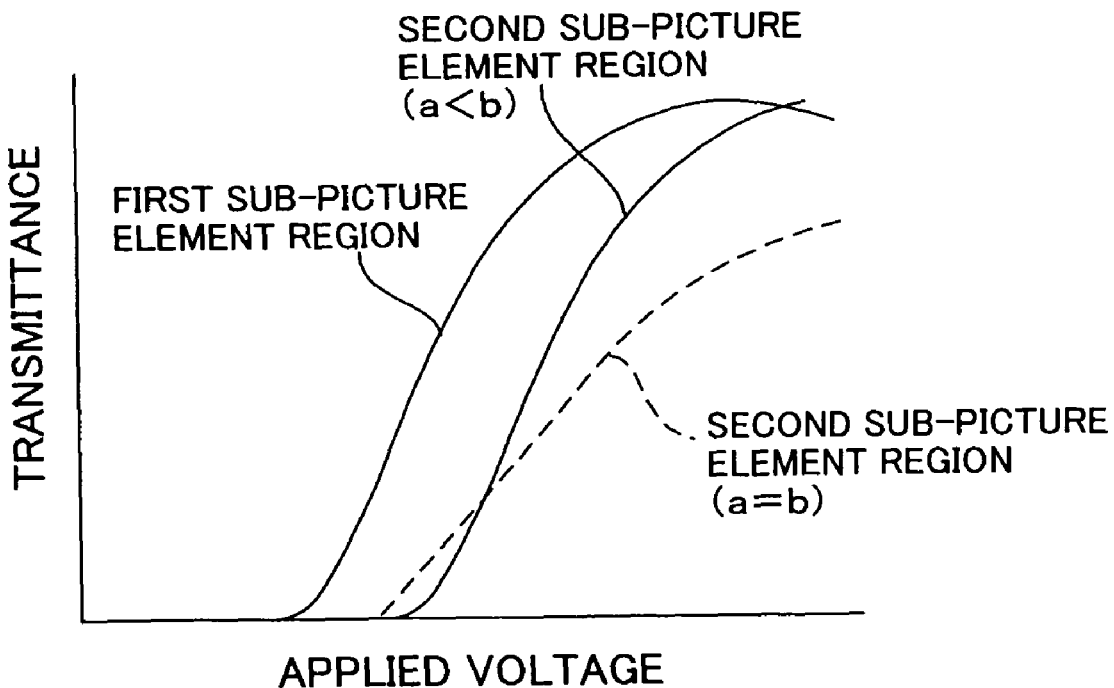
FIG. 5 is a diagram showing T-V characteristics in a first and a second sub-picture element regions A1 and A2 of the liquid crystal display device of the embodiment of the present invention.

The horizontal axis represents the applied voltage and the vertical axis represents the transmittance in FIG. 5 showing T-V characteristics in the first sub-picture element region A1 and the second sub-picture element region A2. It should be noted that a curve shown with a broken line represents the T-V characteristic when the liquid crystal layer thickness of the second sub-picture element region A2 is the same as that of the first sub-picture element region A1.

As shown in this FIG. 5, in the second sub-picture element region A2, when the liquid crystal layer thickness is thicker than that of the first sub-picture element region A1 (a<b), threshold voltage becomes somewhat higher compared to the case where the liquid crystal layer thickness is the same as that of the first sub-picture element region A1 (a=b), and the initial rise in T-V characteristics will be steep. As a result, the transmittance in the second sub-picture element region A2 in a white display voltage approaches that in the first sub-picture element region A1 and the brightness is improved. Moreover, it is not necessary to increase the voltage of the display signals excessively in order to enhance the brightness in the second sub-picture element region A2 and when viewed from the front, the phenomenon where screen appears yellow will be avoided.

In addition, since a plurality of regions (multi-domains) with liquid crystal molecules inclined in mutually different directions are formed by the protrusions 53, favorable viewing angle characteristics are obtained in the liquid crystal display device of this embodiment. Furthermore, in the liquid crystal display device of this embodiment, since two sub-picture element regions A1 and A2 with mutually different thresholds for T-V characteristics are present in one picture element region, the phenomenon where the screen appears whitish is avoided and the viewing angle characteristics are further improved.

Embodiments of the present invention will be described more specifically below.

First Embodiment

Figure 6:
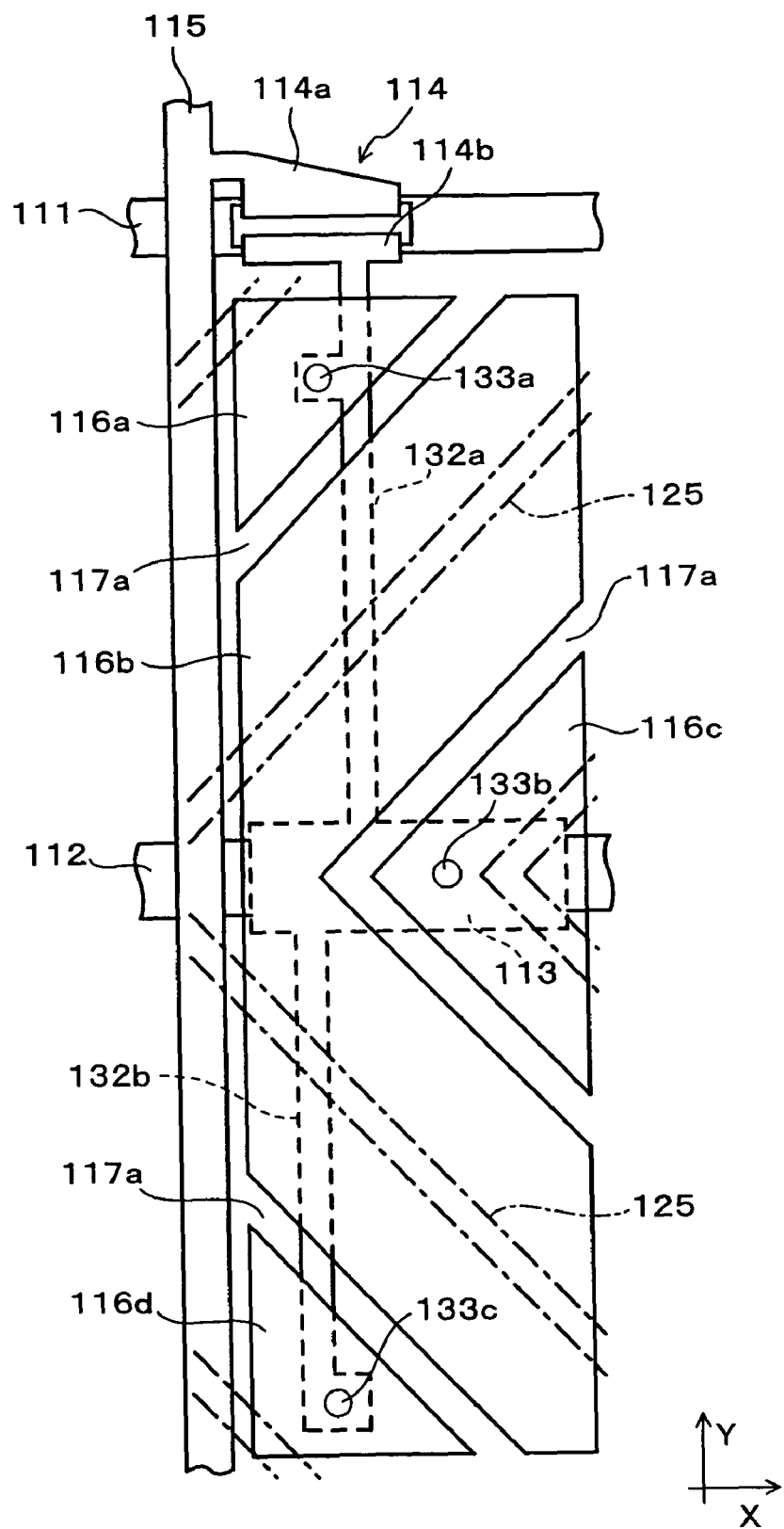
FIG. 6 is a plan view showing a liquid crystal display device of a first embodiment of the present invention.
Figure 7:
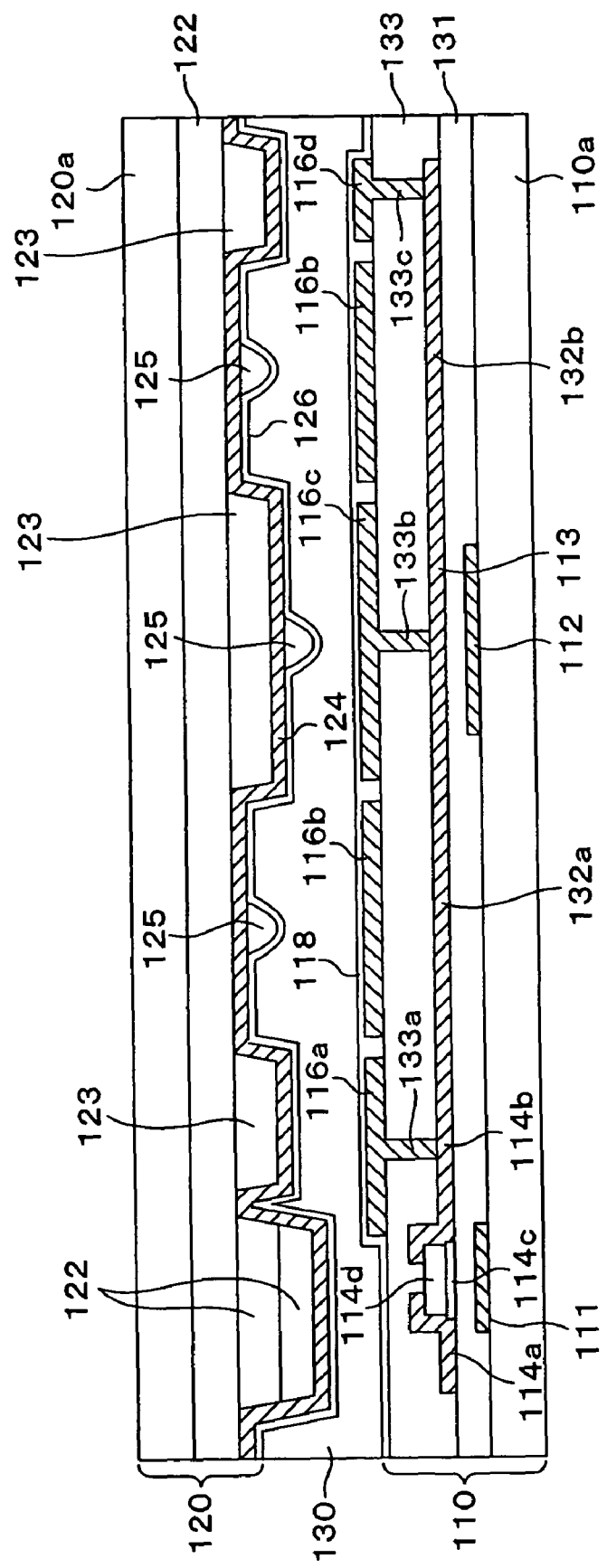
FIG. 7 is a cross section of the same.

FIG. 6 is a plan view showing a liquid crystal display device of a first embodiment of the present invention and FIG. 7 is a cross section of the same.

As shown in FIG. 7, a liquid crystal display device of this embodiment is configured by a TFT substrate 110, an opposite substrate 120, and a liquid crystal layer 130 formed of vertically aligned liquid crystals (liquid crystals with negative dielectric anisotropy) filled in a space between these substrates 110 and 120.

A plurality of gate bus lines 111 extending horizontally (X axis direction) and a plurality of data bus lines 115 extending vertically (Y axis direction) are formed on the TFT substrate 110 as shown in FIG. 6. The gate bus lines 111 are placed in a vertical direction with a pitch of, for example 300 μm and the data bus lines 115 are placed in a horizontal direction with a pitch of, for example 100 μm. Rectangular regions defined by the gate bus lines 111 and the data bus lines 115 are the respective picture element regions.

Moreover, an auxiliary capacitance bus line 112 placed in parallel to the gate bus lines 111 and traversing the center of the picture element region is formed on the TFT substrate 110. Furthermore, a TFT 114, interconnects 132a and 132b, an auxiliary capacitance electrode 113 and picture element electrodes are formed on the TFT substrate 110. As shown in FIG. 6, picture element electrodes are divided into four sub-picture element electrodes 116a to 116d by slits 117a, which is vertically symmetrical and extending in an oblique direction. These sub-picture element electrodes 116a to 116d are formed of a transparent conductive material like ITO. Additionally, these sub-picture element electrodes 116a to 116d are covered with a vertical alignment film 118 formed of polyimides for example.

It should be noted that the slits 117a also function as a structure for alignment control. In other words, an electric line of force is generated outward from the edges of sub-picture element electrodes 116a to 116d in an oblique direction when the voltage is applied. Since liquid crystal molecules with a negative dielectric anisotropy tend to incline in a direction perpendicular to the electric line of force, directions in which liquid crystal molecules incline are different in both sides of the slits 117a. In the liquid crystal display device of this embodiment, alignment division (multi-domains) is achieved by the protrusions for alignment control 125 and the slit 117a.

The TFT 114 uses a part of the gate bus lines 111 as a gate electrode. Moreover, a drain electrode 114a of the TFT 114 is connected to the data bus lines 115 and the source electrode 114b is placed in a position opposite to the drain electrode 114a while interposing the gate bus lines 111 in between.

A layer structure of the TFT substrate 110 and the opposite substrate 120 will be described below by referring to FIG. 7. The layer structure of the TFT substrate 110 will be described first.

The gate bus lines 111 and an auxiliary capacitance bus line 112 are formed on a glass substrate 110a, which is to become a base for the TFT substrate 110. These gate bus lines 111 and the auxiliary capacitance bus line 112 are formed by, for example, patterning a metal film such as chromium (Cr) film or an aluminium (Al)-titanium (Ti) lamination film with the photolithography method.

These gate bus lines 111 and the auxiliary capacitance bus line 112 are covered with a first insulating film (gate insulating film) 131 made of $SiO_2$ or SiN and so on formed on the glass substrate 110a. A semiconductor film (for example, amorphous silicon film or polysilicon film) 114c to become an active layer for the TFT 114 is formed in a predetermined region on this first insulating film 131.

A channel protection film 114d made of SiN and the like is formed on the semiconductor film 114c. The drain electrode 114a and the source electrode 114b of the TFT 114 are formed on both sides of this channel protection film 114d.

Figure 1:
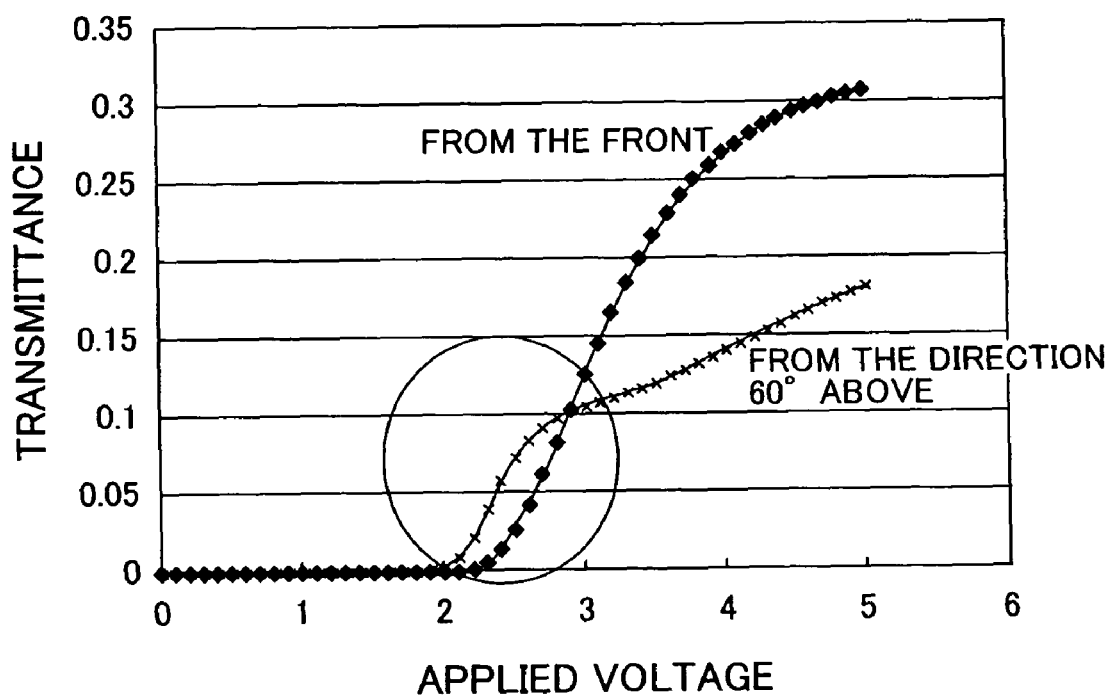
FIG. 1 is a diagram showing T-V (transmittance-applied voltage) characteristics when viewing a screen from the front and from the direction 60° above.
Figure 2:
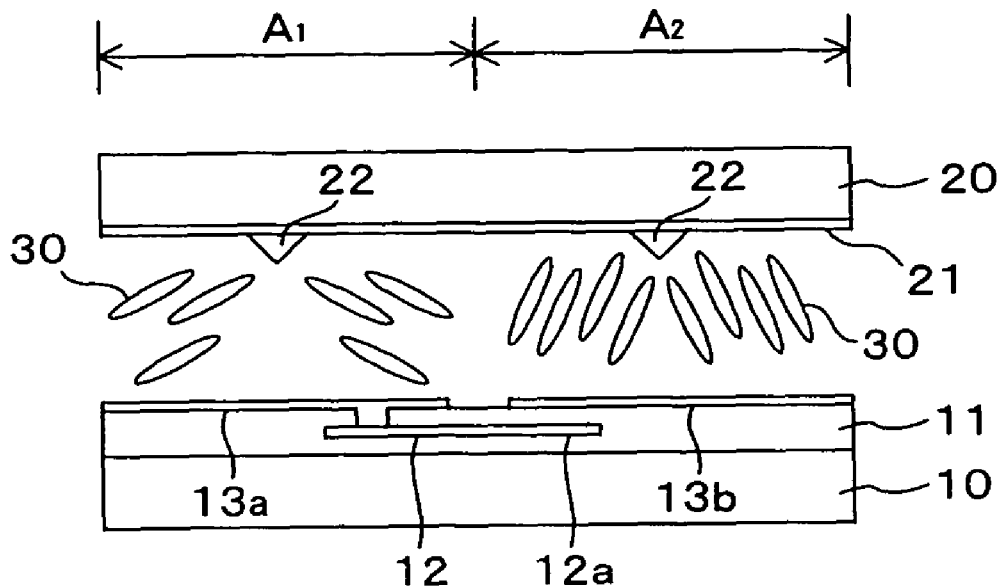
FIG. 2 is a schematic diagram of an example of a conventional MVA type liquid crystal display device adopting the halftone grayscale (HT) method.
Figure 3:
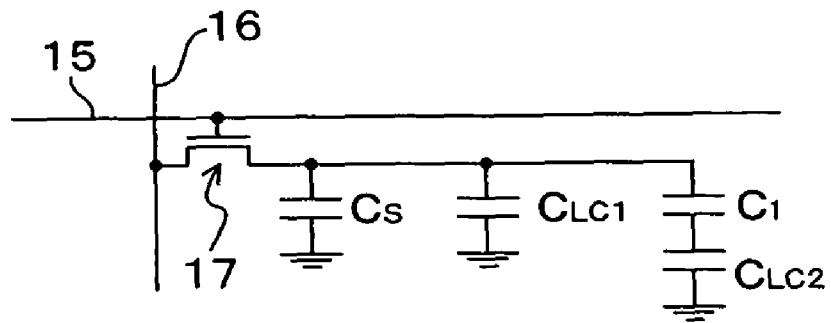
FIG. 3 is a diagram showing an equivalent circuit of the liquid crystal display device shown in FIG. 2.

Additionally, the data bus lines 115, the auxiliary capacitance electrode 113, and the interconnects 132a and 132b are formed on the first insulating film 131. The data bus lines 115 are connected with the drain electrode 114a of the TFT 114 as described earlier. Moreover, the auxiliary capacitance electrode 113 is placed in a position opposite to the auxiliary capacitance bus line 112 with the first insulating film 131 interposed in between. An auxiliary capacitance Cs (refer to the equivalent circuit in FIG. 3) is consisted of this auxiliary capacitance electrode 113, auxiliary capacitance bus line 112, and the first insulating film 131 between the two. Between the auxiliary capacitance electrode 113 and the source electrode 114b are electrically connected by the interconnects 132a. Furthermore, the interconnects 132b are extended from the auxiliary capacitance electrode 113 towards the side opposite to the interconnects 132a.

The drain electrode 114a, the source electrode 114b, the data bus lines 115, the auxiliary capacitance electrode 113 and the interconnects 132a and 132b are formed by, for example, patterning a three-layer structured Ti—Al—Ti metal film with the photolithography method.

The drain electrode 114a, the source electrode 114b, the data bus lines 115, the auxiliary capacitance electrode 113, and the interconnects 132a and 132b are covered with a second insulating film 133 made of $SiO_2$ or SiN and so on. Sub-picture element electrodes 116a to 116d divided by the slits 117a are formed on this second insulating film 133. The sub-picture element electrode 116a is connected to the interconnect 132a via a contact hole 133a, the sub-picture element electrode 116c is connected to the auxiliary capacitance electrode 113 via a contact hole 133b, and the sub-picture element electrode 116d is connected to the interconnects 132b via a contact hole 133c. Moreover, the sub-picture element electrode 116b is capacitively coupled with a part of the auxiliary capacitance electrode 113 and parts of interconnects 132a and 132b with the second insulating film 133 interposed in between the sub-picture element electrode 116b and the auxiliary capacitance electrode 113 and between the sub-picture element electrode 116b and interconnects 132a and 132b. In other words, among the auxiliary capacitance electrode 113 and the interconnects 132a and 132b, the part opposite to the sub-picture element electrode 116b functions as a control electrode in this embodiment.

These sub-picture element electrodes 116a to 116d are formed by first forming a transparent conductive film made of ITO and so formed on the second insulating film 133 and then patterning this transparent conductive film by the photolithography method. A vertically aligned film 118 made of polyimides and so on is formed on sub-picture element electrodes 116a to 116d.

A layer structure of the opposite substrate 120 will be described next color filters 122 are formed on a glass substrate 120a, which is to become a base for the opposite substrate 120. There are three kinds of color filters 122; i.e. red, green, and blue, and one color filter of either red, green, or blue is arranged for each picture element. Three picture elements of red, green, and blue adjacent to each other constitute one pixel, thus enabling the display in various colors.

In addition, color filters of red, green, and blue are laminated in a position opposite to the gate bus lines 111, data bus lines 115, and the TFT 114 on the TFT substrate 110 side and forming a black matrix (shading film).

Transparent resin films 123 are formed on the color filters 122 (under the color filters 122 in FIG. 7). The transparent resin films 123 are formed in positions opposite to sub-picture element electrodes (directly connected picture element electrode) 116a, 116c, and 116d but not in parts opposite to the sub-picture element electrode (capacitively coupled picture element electrode) 116b. This transparent resin films 123 are formed by, for example, a negative type photoresist or an acrylic resin.

A common electrode 124 made of a transparent conductive material like ITO is formed on the color filters 122 and the transparent resin films 123 (under the color filters 122 and the transparent resin films 123 in FIG. 7). Bank-shaped protrusions 125 for alignment control are formed on this common electrode 124 (under the common electrode 124 in FIG. 7). As shown in FIG. 6, this bank-shaped protrusions 125 are formed along the line curving on the gate bus lines 111 and the auxiliary capacitance bus line 112 and placed in positions shifted in the horizontal direction relative to the slits 117a on the TFT substrate 110. The protrusions 125 are formed by, for example, a negative type photoresist. Surfaces of the common electrode 124 and the protrusions 125 are covered with a vertically aligned film 126 made of polyimides for example.

Figure 8:
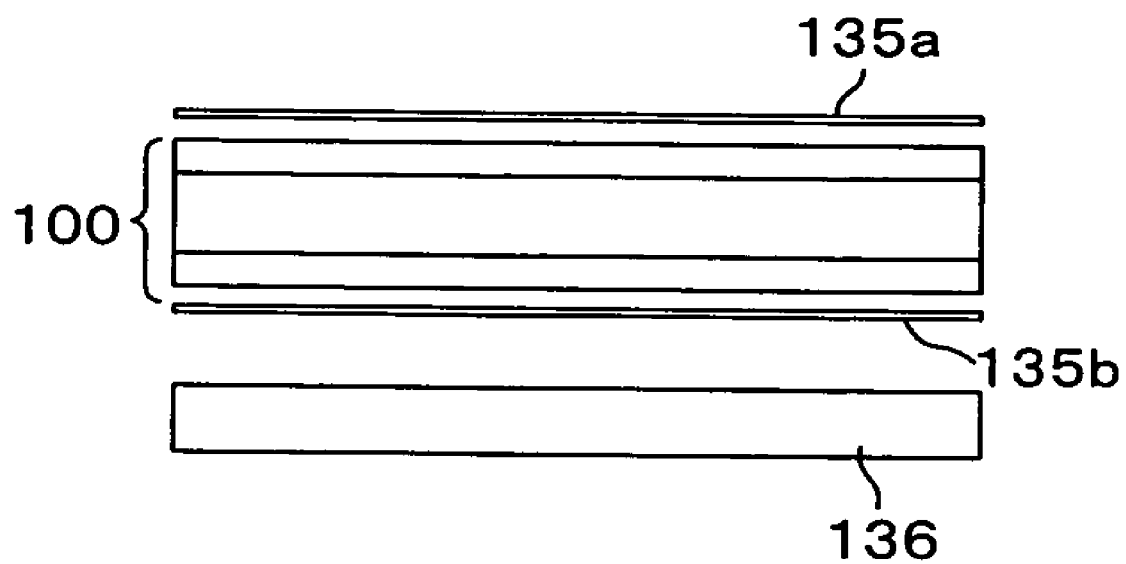
FIG. 8 is a schematic diagram showing the liquid crystal display device of the first embodiment and is a diagram showing a state where a polarizing plate and a backlight are placed.

Incidentally, as shown in FIG. 8, a first polarizing plate 135a is placed on the front side (the upper side in FIG. 8) of a liquid crystal panel 100 configured by the TFT substrate 110, the opposite substrate 120, and the liquid crystal filled in a space between the two substrates. A second polarizing plate 135b and a backlight 136 are placed on the back side (the lower side in FIG. 8) of the liquid crystal panel 100 as shown in FIG. 8. The first and second polarizing plates 135a and 135b are placed while making their absorption axes perpendicular to each other. Moreover, it is possible to place a phase plate between the liquid panel 100 and the first polarizing plate 135a, and between the liquid crystal panel 100 and the second polarizing plate 135b, respectively.

In the liquid crystal display device of this embodiment configured in such a way, when voltage is not applied (initial state), liquid crystal molecules are aligned almost perpendicular to a substrate surface. Note here that the liquid crystal molecules in the vicinity of the protrusions 125 are aligned perpendicular to inclined planes of the protrusions 125. In this state, no light is outputted in the front side of the liquid crystal panel 100 since the light outputted from the backlight 136 is blocked by the two polarizing plates 135a and 136b. In other words, it will be a black display (dark display) when the voltage is not applied to the liquid crystal layer.

When scanning signals are supplied to the gate bus lines 111 and the TFT 114 is turned on, display signals are supplied from the data bus lines 115 to the source electrode 114b. The voltage of the display signals is applied to the sub-picture element electrodes 116a, 116c, and 116d as a result of this and the voltage lower than the display signal voltage by an amount of capacity coupling is applied to the sub-picture element electrode 116b. Liquid crystal molecules are then inclined and aligned at an angle according to the applied voltage. Since the direction in which the liquid crystal molecules are inclined is determined by the protrusions 125 and the slits 117a at this stage, four regions (domains) where inclination directions of liquid crystal molecules are mutually different are formed in one picture element.

In this state, a part of light emitted from the backlight 136 passes through the polarizing plates 135a and 135b and is outputted to the front side of the liquid crystal panel 100. The amount of light outputted to the front side of the liquid crystal panel 100 is related to the inclination angle of the liquid crystal molecules and a retardation $\Delta$nd of the liquid crystal layer. It is possible to display a desired image on the liquid crystal display device by controlling light transmittance for each picture element.

Figure 9:
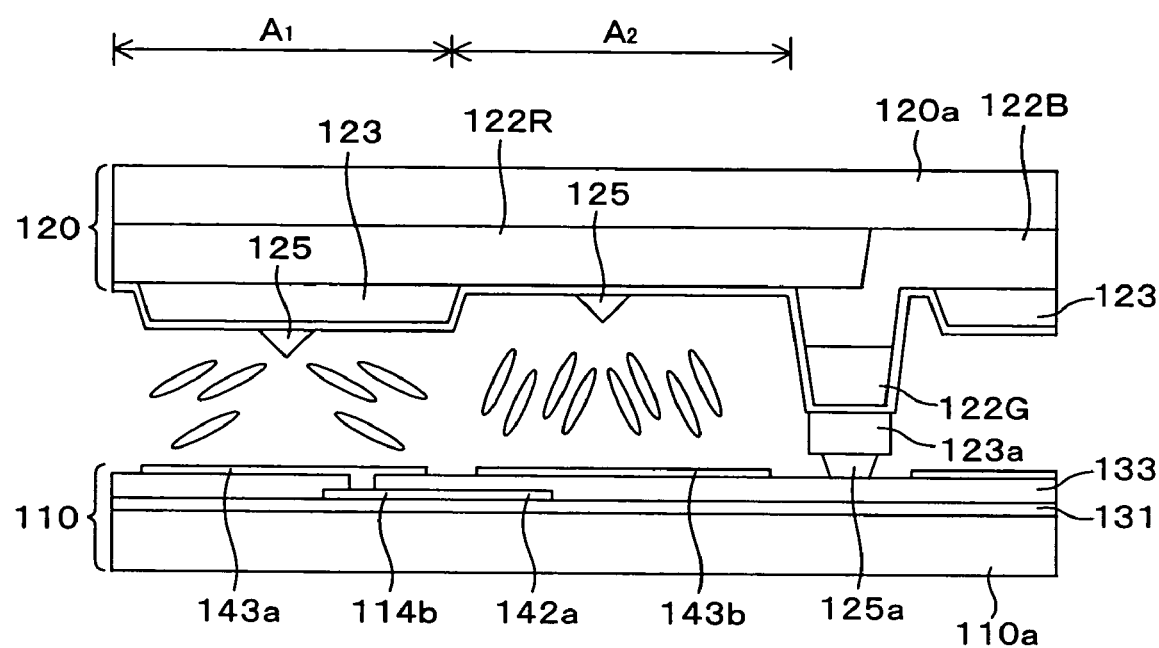
FIG. 9 is a schematic diagram showing a simplified structure of the liquid crystal display device of the first embodiment.

FIG. 9 is a schematic diagram showing a simplified structure of the liquid crystal display device of the first embodiment. In FIG. 9, reference numerals 122R, 122G, and 122B denote red, green, and blue color filters, respectively. Moreover, reference numeral 142a denotes a control electrode (the part opposite to the sub-picture element electrode 116b among the auxiliary capacitance electrode 113 and interconnects 132a and 132b), reference numeral 143a denotes a sub-picture element electrode directly connected to the TFT 114 (sub-picture element electrodes 116a, 116c, and 116d), and reference numeral 143b denotes a sub-picture element electrode (sub-picture element electrode 116b) capacitively coupled to the control electrode 142a.

As described earlier, red, green, and blue color filters 122R, 122G, and 122B are laminated as a black matrix on the opposite substrate 120, in a position opposite to the gate bus lines 111, the data bus lines 115, and the TFT 114 on the side of TFT substrate 110. A transparent resin film 123a and a protrusion 125a are further laminated as a spacer for maintaining an interval between the TFT substrate 110 and the opposite substrate 120 on a part where the gate bus lines 111 and the data bus lines 115 intersect. It is possible to avoid an increase in producing steps by forming the protrusion 125a with the protrusions for alignment control 125 at the same time.

The liquid crystal layer thickness (cell gap) d in the second sub-picture element region A2 is set to 4.2 μm in the liquid crystal display device of this embodiment. Moreover, the thickness of the transparent resin film 123 formed in the first sub-picture element region A1 is set to 1±0.6 μm. Furthermore, a birefringence $\Delta$n of the liquid crystal filled in a space between the TFT substrate 110 and the opposite substrate 120 is 0.08.

Since a plurality of regions where liquid crystal molecules are inclined in mutually different directions, are formed by the protrusions for alignment controls 125 and the slits 117a in the liquid crystal display device of this embodiment, favorable viewing angle characteristics can be obtained. Moreover, since the liquid crystal display device of this embodiment has a plurality of regions with mutually different threshold values for T-V characteristics in one picture element region, the phenomenon where the screen appears whitish when viewed from an oblique direction is suppressed.

Furthermore, since the liquid crystal layer thickness in the second sub-picture element region A2 where the capacitively coupled picture element electrode is placed is thicker than that in the first sub-picture element region A1 where the directly connected picture element electrode is placed, initial rise in T-V characteristics in the second sub-picture element region A2 will be steep and the brightness in the white display mode is improved. Moreover, it is not necessary to increase the display signal voltage excessively in order to enhance the brightness in the second sub-picture element region A2 and the phenomenon where the screen appears yellow when viewed from the front will be avoided.

It should be noted that although red, green, and blue color filters are laminated to form the black matrix in the aforementioned embodiment, it is also possible to laminate any two color filters out of red, green, and blue filters to form the black matrix.

Second Embodiment

Figure 10:
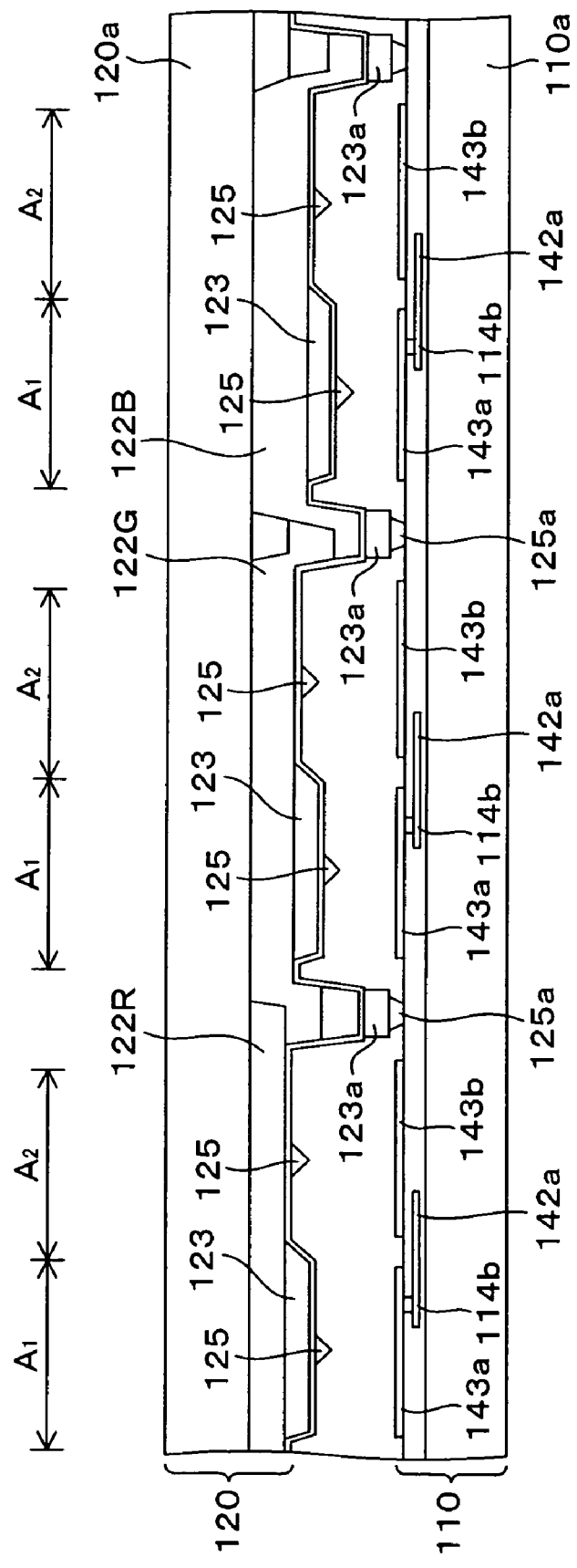
FIG. 10 is a schematic diagram showing a liquid crystal display device of a second embodiment of the present invention.

FIG. 10 is a schematic diagram showing a liquid crystal display device of a second embodiment of the present invention. The difference between this embodiment and the first embodiment is the mutual differences in the liquid crystal layer thicknesses of the red, green, and blue picture elements and other configurations are basically similar to those of the first embodiment. Accordingly, identical materials to those in FIG. 9 are described using identical numerals in FIG. 10 and their detailed descriptions will be omitted.

In this embodiment, thicknesses of red, green, and blue color filters 122R, 122G, and 122B are increased in this order. Therefore, the liquid crystal layer thickness (cell gap) of the red picture element is the largest and the liquid crystal layer thickness of the blue picture element is the smallest. In this embodiment, the liquid crystal layer thickness of the red picture element (the liquid crystal layer thickness in the second sub-picture element region A2: the same hereinafter) is set to 4.7 μm, the liquid crystal layer thickness of the green picture element is set to 4.2 μm, and the liquid crystal layer thickness of the blue picture element is set to 3.6 μm. Note here that these values are not limited to those described and should be set in order to make the value of $\Delta n \cdot d/\lambda$ in each picture element equal.

In order to offset the differences in the liquid crystal layer birefringence dependent on the color and to further improve the color reproducibility, the liquid crystal layer thicknesses of the red and green picture elements may be increased than that of the blue picture element. In this embodiment, by forming the blue color filter 122B thicker than red and green color filters 122R and 122G, the liquid crystal layer thicknesses of the red and green picture elements are made thicker than that of the blue picture element. For this reason, the liquid crystal display device of this embodiment can achieve an effect of further improving the color reproducibility in addition to the similar effects to those obtained in the first embodiment.

It should be noted that although the liquid crystal layer thicknesses of the red, green and blue picture elements are different respectively in the above described second embodiment, it is possible to obtain similar effects by making the liquid crystal layer thicknesses of the red and green picture elements the same and the liquid crystal layer thickness of the blue picture element smaller than those of the red and green picture elements.

Third Embodiment

Figure 11:
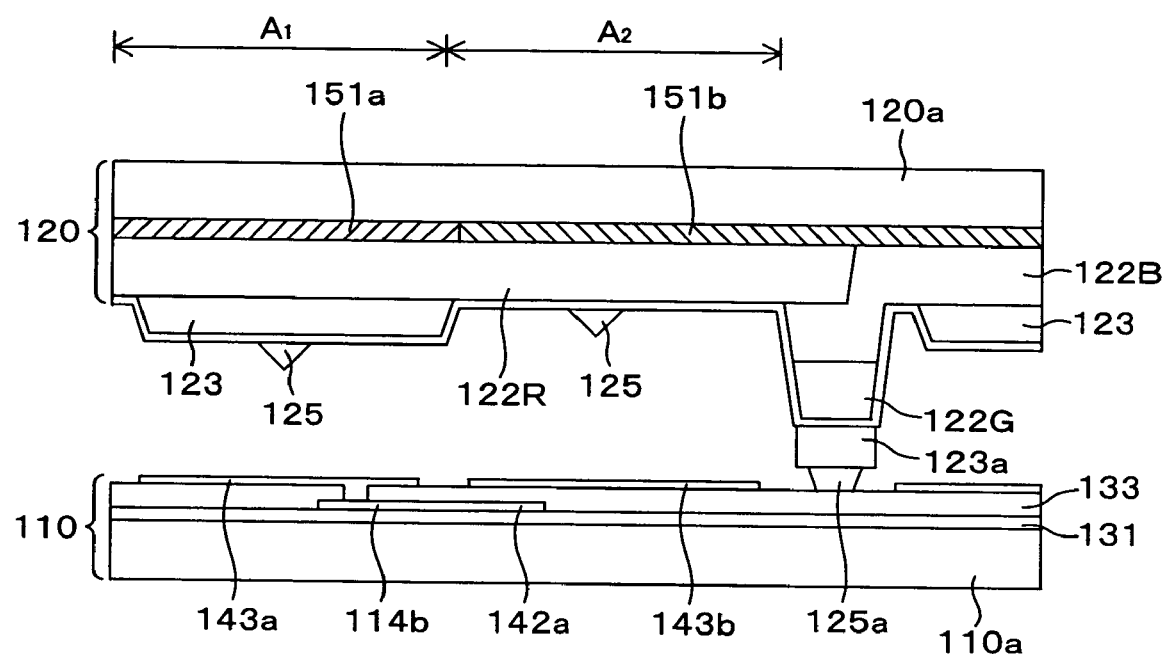
FIG. 11 is a schematic diagram showing a liquid crystal display device of a third embodiment of the present invention.

FIG. 11 is a schematic diagram showing a liquid crystal display device of a third embodiment of the present invention. The difference between this embodiment and the first embodiment is the formation of viewing angle compensation films (phase plates) 151a and 151b between the glass substrate 120a, which is to become a base for the opposite substrate 120, and color filters 122R, 122G, and 122B, and other structures of this embodiment are basically similar to those of the first embodiment. Accordingly, identical materials to those in FIG. 9 are described using identical numerals in FIG. 11 and their detailed descriptions will be omitted.

In this embodiment, viewing angle compensation films 151a and 151b are formed between the glass substrate 120a, which is to become a base for the opposite substrate 120, and the color filters 122R, 122G, and 122B. The viewing angle compensation film 151a on one hand, is placed in the first sub-picture element region A1 where the directly connected picture element electrode 143a is formed, and the viewing angle compensation film 151b on the other hand, is placed in the second sub-picture element region A2 where the capacitively coupled picture element electrode 143b is formed. These viewing angle compensation films 151a and 151b are both formed of a polymer film with negative refractive index anisotropy and provided in order to offset the positive refractive index anisotropy of the liquid crystal layer.

Polymer films with a refractive index anisotropy of opposite polarity to that of the refractive index anisotropy of the liquid crystal layer have hitherto been used as viewing angle compensation films in order to offset the refractive index anisotropy of the liquid crystal layer and to further improve viewing angle characteristics. Since the liquid crystal layer is formed of the liquid crystals with positive refractive index anisotropy in the liquid crystal display device of this embodiment, a viewing angle compensation film needs to be the one with negative refractive index anisotropy. In other words, a polymer film is used in which a relation described by the formula below is established:

$$nx = ny > nz$$

where nx and ny are refractive indices of in-plane directions and nz is a refractive index in the thickness direction. Compensation capability R of this polymer film in the vertical direction is described by the formula below:

$$R = ((nx+ny)/2 - nz) \times d$$

Here, d denotes a thickness of the polymer film.

When the refractive index anisotropy of the liquid crystal and the liquid crystal layer thicknesses (cell gaps) in the first and second sub-picture element regions A1 and A2 are defined as $\Delta n$, $d_1$, and $d_2$ respectively (note here that $d_1 < d_2$), retardations of the liquid crystal layers in the first and second sub-picture element regions A1 and A2 will be $\Delta n d_1$ and $\Delta n d_2$, respectively.

As described so far, since retardation of the liquid crystal layer in the first sub-picture element region A1 $\Delta n d_1$ and retardation of the liquid crystal layer in the second sub-picture element region A2 $\Delta n d_2$ differ in the liquid crystal display device of this embodiment, it is necessary to change the compensation capability of the viewing angle compensation film in response to this. For example, by making the viewing angle compensation film 151b thicker than the viewing angle compensation film 151a, it is possible to provide differences between the viewing angle compensation films 151a and 151b in compensation capabilities. Moreover, viewing angle compensation films 151a and 151b may be formed by materials with different optical properties, respectively.

In addition to capability of obtaining similar effects to those of the first embodiment, the liquid crystal display device of this embodiment has a merit in further improving the viewing angle characteristics since the viewing angle compensation films 151a and 151b with optical compensation capabilities in accordance with the liquid crystal layer thickness in the first and second sub-picture element regions A1 and A2 are provided.

It should be noted that although the case where the viewing angle compensation films are placed on the inner side of the liquid crystal panel is described, the viewing angle compensation films may be formed on the outer side of the liquid crystal panel, that is, between the liquid crystal panel and the polarizing plate.

Moreover, viewing angle compensation films similar to those of this embodiment can be adopted to the liquid crystal display device where cell gaps are respectively optimized for red, green, and blue picture element as described in the second embodiment. An example of adopting a viewing angle compensation film to a liquid crystal display device in which cell gaps for red, green, and blue picture element are optimized, respectively is shown in FIG. 12. In this FIG. 12, identical materials to those in FIG. 10 are described using identical symbols. In addition, reference numerals 161a to 161f are viewing angle compensation films with compensation capabilities in accordance with the retardation Δnd of the liquid crystal layer in each sub-picture element region.

What is claimed is:

1. A liquid crystal display device formed of first and second substrates placed opposite to each other and a liquid crystal filled in a space between these substrates while one picture element is being divided into at least first and second sub-picture element regions, comprising:
 a first sub-picture element electrode formed in the first sub-picture element region on the first substrate and applied with a first voltage in accordance with display signals;
 a second sub-picture element electrode formed in the second sub-picture element region on the first substrate and applied with a second voltage lower than the first voltage; and
 a common electrode formed on the second substrate and opposed to the first and second sub-picture element electrodes while interposing a liquid crystal layer in between,
 wherein a liquid crystal layer thickness of the second sub-picture element region is thicker than that of the first sub-picture element region.

2. The liquid crystal display device according to claim 1, wherein a transparent insulating film with a thickness corresponding to a difference in the liquid crystal layer thicknesses of the first and second sub-picture element regions is formed in the first sub-picture element region.

3. The liquid crystal display device according to claim 1, wherein protrusions for alignment control made of a dielectric are formed on the second substrate.

4. The liquid crystal display device according to claim 1, wherein the liquid crystals have negative dielectric anisotropy.

5. The liquid crystal display device according to claim 1, wherein data bus lines supplied with the display signals, gate bus lines supplied with scanning signals, a thin film transistor driven by the scanning signals by connecting a drain electrode to the data bus lines, and a control electrode connected to a source electrode of the thin film transistor are formed on the first substrate, and
 wherein the first sub-picture element electrode is electrically connected to the source electrode of the thin film transistor and the second sub-picture element electrode is capacitively coupled to the control electrode.

6. The liquid crystal display device according to claim 5, wherein a color filter of any one color of red, green and blue is formed for each picture element on the second substrate and at least two or more of these color filters are laminated to form a shading film in a part opposite to the gate bus lines, the data bus lines and the thin film transistor.

7. The liquid crystal display device according to claim 6, wherein a transparent insulating film and protrusions made of a dielectric are laminated on the shading film to form spacers in positions opposite to parts where the gate bus lines and the data bus lines on the second substrate intersect.

8. The liquid crystal display device according to claim 6, wherein the liquid crystal layer thicknesses of the red picture element placed with the red color filter and of the green picture element placed with the green color filter are thicker than that of the blue picture element placed with the blue color filter.

9. The liquid crystal display device according to claim 1, comprising:
 a first viewing angle compensation film for offsetting a liquid crystal layer retardation in the first sub-picture element region; and
 a second viewing angle compensation film for offsetting a liquid crystal layer retardation in the second sub-picture element region,
 wherein the first and second viewing angle compensation films have mutually different compensation capabilities.

10. The liquid crystal display device according to claim 9, wherein the first and second viewing angle compensation films are formed on a surface of the liquid crystal layer side on the second substrate.

11. The liquid crystal display device according to claim 1, wherein polarizing plates are respectively placed on surfaces of the first and second substrates present in the sides opposite to the liquid crystal layer and absorption axes of these polarizing plates are mutually perpendicular.

12. The liquid crystal display device according to claim 1, wherein the first and second sub-picture element electrodes are substantially coplanar.

\* \* \* \* \*